(12) United States Patent
Wang et al.

(10) Patent No.: US 8,855,958 B2
(45) Date of Patent: Oct. 7, 2014

(54) METHOD FOR DETERMINING AT LEAST ONE CHARACTERISTIC FOR THE CORRECTION OF MEASUREMENTS OF A CORIOLIS MASS FLOWMETER

(75) Inventors: Xue Wang, Canterburry (GB); Yousif Hussain, Weston Favell (GB)

(73) Assignee: Krohne AG, Basel (CH)

( * ) Notice: Subject to any disclaimer, the term of this patent is extended or adjusted under 35 U.S.C. 154(b) by 905 days.

(21) Appl. No.: 12/860,183

(22) Filed: Aug. 20, 2010

(65) Prior Publication Data

US 2011/0184667 A1 Jul. 28, 2011

(30) Foreign Application Priority Data

Jan. 28, 2010 (DE) .......................... 10 2010 006 224

(51) Int. Cl.
*G01F 1/00* (2006.01)
*G01F 1/84* (2006.01)
*G01F 25/00* (2006.01)

(52) U.S. Cl.
CPC .......... *G01F 1/8436* (2013.01); *G01F 25/0007* (2013.01)
USPC .......... 702/100; 702/45; 702/50; 73/861.355; 73/861.357

(58) Field of Classification Search
USPC .......................... 73/861.355–861.357; 702/45
See application file for complete search history.

(56) References Cited

U.S. PATENT DOCUMENTS

| 5,228,327 A | 7/1993 | Bruck |
| 5,239,456 A | 8/1993 | Badavas et al. |
| 5,504,692 A | 4/1996 | Cardner |
| 6,466,880 B2 * | 10/2002 | Cunningham et al. .......... 702/50 |
| 7,706,987 B2 * | 4/2010 | Sharp et al. ..................... 702/48 |

OTHER PUBLICATIONS

John Robert Taylor; Statistical Analysis of Random Uncertainties, Jan. 1, 1982, An Introduction to Error Analysis: The Study of Uncertainties in Physical Measurements / John R. Taylor; (A Series of Books in Physics), Mill Valley, Calif.: Univ. Science Books, pp. 81-98, XP008136455, ISBN: 0-935702-07-5.

* cited by examiner

*Primary Examiner* — Jonathan C Teixeira Moffat
*Assistant Examiner* — Hien Vo
(74) *Attorney, Agent, or Firm* — Roberts Mlotkowski Safran & Cole, P.C.; David S. Safran

(57) ABSTRACT

A method for determining at least one characteristic for the correction of measurements of a Coriolis mass flowmeter which is characterized by an increased accuracy and a low error rate while determining the characteristic is implemented by detecting values of a measurand during constant flow with the reading sensors, calculating at least one location parameter from the detected values, an calculating at least one dispersion parameter from the detected values and the location parameter. The detection of additional values and the calculation of the location parameter and dispersion parameter from the existing and additional values is carried out until the dispersion parameter reaches a threshold value, and then, the location parameter corresponding to the dispersion parameter is used as the characteristic for the correction of the reading of the Coriolis mass flowmeter.

1 Claim, 4 Drawing Sheets

METHOD FOR DETERMINING AT LEAST ONE CHARACTERISTIC FOR THE CORRECTION OF MEASUREMENTS OF A CORIOLIS MASS FLOWMETER

BACKGROUND OF THE INVENTION

1. Field of the Invention

The invention relates to a method for determining at least one characteristic for the correction of measurements of a Coriolis mass flowmeter. The invention further relates to a Coriolis mass flowmeter having at least one measuring tube, at least two sensors and at least one actuator, wherein the measuring tube can be excited to at least one oscillation with the actuator.

2. Description of Related Art

Coriolis mass flowmeters of the type above have been known for a long time and, due to their measuring principle are theoretically unsusceptible to the properties of the measuring medium, such as e.g., thermal conductivity, thermal capacity and viscosity. They measure the mass flow directly by evaluating a mechanical oscillation of the measuring tube influenced by the mass flow.

However, in commercial use, especially for Coriolis mass flowmeters having a single measuring tube, the problem often arises that there is a change in zero point and sensitivity during operation. This change can, in particular, be ascribed to the coupling of the oscillation system with its environment. A change in the environmental conditions leads to a change in the characteristic properties of the measuring system. For this reason, both the zero point and the sensitivity have to be corrected in consideration of the current operating and mounting conditions in order to be able to ensure a required high accuracy.

The central element of Coriolis mass flowmeters is the measuring tube, which has medium flowing through it of which the mass is recorded. Coriolis mass flowmeters having multiple measuring tubes—straight or curved—are also known. For the sake of simplicity, one single measuring tube is discussed in the following, however, the implementations are also valid without limitations for Coriolis mass flowmeters having multiple measuring tubes. The measuring tube is rigidly anchored at its ends and is excited to oscillation in resonance in its first eigenmode by an electro-magnetic actuator. The detection of the measuring tube oscillation often occurs using two electro-magnetic sensors. In the ideal case, both measuring tube halves oscillate synchronously without mass flow. As soon as mass flow occurs through the measuring tube, Coriolis forces occur due to the velocities of the movement of the measuring tube, on the one hand, and the movement of the mass particles in the measuring tube, on the other hand, being orthogonal to one another. These are oppositely oriented relative to one another on the in-flowing and out-flowing side of the measuring tube, so that the oscillation of the measuring tube half is advanced on the in-flowing side in respect to the movement of the oscillation of the measuring tube half on the out-flowing side.

The phase-shift of the oscillation of the measuring tube occurring during mass flow, which is ultimately seen in a time delay of the oscillation between the two measuring tube halves, is proportional to the mass flow and is, thus, used in determining the measurements. In particular, for this reason, it is necessary to have precise knowledge of the oscillation properties of the measuring system, especially the first eigenmode at zero flow. In the sense mentioned above, the phase difference between the oscillation of the measuring tube halves—or other sections of the measuring tube, which can depend on the eigenmode, in which the measuring tube is excited—is a measurand, even if it is a measurand derived from the detected oscillation of the measuring tube. Coriolis mass flowmeters often show a phase difference other than zero, even at zero flow, and consequently, deviate from theoretical behavior. In order to ensure a certain degree of accuracy, this knowledge of the zero point offset of the phase is of particular interest in practice.

In the prior art, the time difference resulting from the phase difference of the oscillation is determined between the two sensors and a mean is calculated from the determined values, which is used for correcting the measurements. The methods for a determination of characteristics for correcting the measurements of a Coriolis mass flowmeter known from the prior art are, however, prone to errors and often less exact, which is why they lead to inaccuracies even with the already corrected measurements of the Coriolis mass flowmeter.

SUMMARY OF THE INVENTION

Based on the above prior art, a primary object of the present invention is to provide a method for determining at least one characteristic for the correction of measurements of a Coriolis mass flowmeter and a Coriolis mass flowmeter which is characterized by increased accuracy and lower error susceptibility while determining the characteristic.

The above object is met with a method for determining at least one characteristic for the correction of measurements of a Coriolis mass flowmeter having at least one measuring tube, at least two sensors and at least one actuator, wherein the measuring tube can be excited to at least one oscillation with the actuator in that the following method steps are included:

detecting values of a measurand during constant flow with the sensors, calculating at least one location parameter from the detected values, calculating at least one dispersion parameter from the detected values and the location parameter, wherein the detection of additional values and the calculation of location parameter and dispersion parameter from the existing and additional values is carried out so often until the dispersion parameter as selection criterion reaches a threshold value, and wherein, then, the location parameter corresponding to the dispersion parameter is used as characteristic for the correction of the measurements of the Coriolis mass flowmeter.

In order to determine the characteristic required for the correction of measurements of a Coriolis mass flowmeter, the measuring tube is thus excited by the actuator to at least one oscillation and the flow is kept at a constant rate, so that the measurements can be detected by both sensors, which, for example, are attached to the measuring tube. Subsequently, at least one location parameter is calculated from the detected values—displacements of the measuring tube and measurements derived from them—which describes the location of all the previously determined values, thus, of the elements of a population, in respect to a measuring scale.

Then, at least one dispersion parameter is calculated from the detected values and the calculated location parameter, wherein the dispersion parameter is to be understood as statistical parameter, through its determination statements can be made about the dispersion of the values around the location para meter. The dispersion parameter is, thus, an index for the quality of the determined location parameter. The more values there are, the more stable the location parameter and the smaller, for example, the value of the dispersion parameter.

The detection of additional values and calculating of location parameter and dispersion parameter from the existing and additional values is carried out so often, until the dispersion parameter as selection criterion reaches a threshold value, so that, then, the location parameter belonging to the dispersion parameter that reached the threshold value is used as characteristic for the correction of the measurements of the Coriolis mass flowmeter. Here, the parameters—location parameter and dispersion parameter—are always calculated with each new calculation out of the cumulative population of all previously determined values with each newly arrived value so that the location parameter and also the dispersion parameter is always to be newly calculated with each newly arriving value.

This iteration is interrupted when the dispersion parameter, as selection criterion, reaches a threshold value, which, for example, is pre-defined by a user in the beginning. As soon as the dispersion parameter meets the given threshold value, the location parameter belonging to this dispersion parameter can be used for the correction of the measurements of a Coriolis mass flowmeter. Depending on the operation and mounting situation of the Coriolis mass flowmeter, the duration of the method according to the invention is, consequently, adapted to the current conditions, which means that when a location parameter being evaluated as reliable by using the dispersion parameter has already been determined with few values, the method can then be terminated early. Thus, it can be avoided that the method is carried out at unnecessary lengths when a sufficiently exact location parameter exists. On the other hand, it is possible that the individual operation and installation situation makes the detection of very many values necessary before a location parameter has been determined that is evaluated as sufficiently exact by the dispersion parameter.

A quantile, in particular, the median or mode is, for example, suitable as location parameter. It has been shown to be of particular advantage when the location parameter is a mean. Here, this can be, for example, an arithmetic, a geometric or a harmonic mean. The mean is calculated from the cumulative entirety of the values detected up to the calculation time. For evaluating the location parameter or the mean, a dispersion parameter is subsequently calculated—as described above. Suitable dispersion parameters are, for example, empirical variance, standard deviation, range or standard error. However, it has been shown to be of particular advantage for the method when the dispersion parameter is the standard error, in particular the standard error of a mean.

The standard error is a measure of dispersion for a sampling distribution, here, a measure of dispersion for the entirety of the values determined by the sensors. The standard error is defined as the standard deviation of the location parameter, thus, for example, of the mean. The standard error is determined as the root of the variance of the distribution of the sampling means of equal-sized, independent, random samples. The standard error $S_{\bar{t}_0}$ of a mean $\bar{t}_0$ is calculated according to the following relation, wherein N is the number of values and $s_{\bar{t}_0}$ is the standard deviation:

$$S_{\bar{t}_0} = \frac{s_{\bar{t}_0}}{\sqrt{(N)}}. \qquad \text{Equation 1}$$

Thus, the standard deviation is defined as follows:

$$S_{\bar{t}_0} = \sqrt{\frac{1}{N-1}\sum_{i=1}^{N}(\Delta t_{0i} - \bar{t}_0)^2}, \qquad \text{Equation 2}$$

wherein the value $\Delta t_{0i}$, represents the difference of the values determined using both sensors.

According to a preferred development, it is provided that the measurand is a time difference, in particular, a detected time difference between the oscillations of the measuring tube detected by both sensors, for example, the points in time of the maximum deflection of each measuring tube section. The oscillation of the measuring tube excited by the actuator to oscillation is detected by both sensors. The sensors detect a phase shift of the oscillation at the positions of both sensors. This phase shift of the oscillation of different sections of the measuring tube corresponds to a time difference between the achievement of corresponding deflection—in particular, the achievement of concise maximum deflection—of different measuring tube sections observed by the sensors, which can be detected as a value $\Delta t_0$.

In addition to determining the characteristic for the correction of the flow measurements of the Coriolis mass flowmeter, the method is also suitable, in general, for the diagnosis of Coriolis mass flowmeters, so that, for example, by storing all calculated means, a long-term tendency, i.e., the behavior of the means, can be stored. Conclusions in respect to possible changes in the operation or mounting situation of the Coriolis mass flowmeter can be drawn from this documentation of the long-term chronological course of the means. When, for example, a mean from a medium-term, stable value range drifts in a positive or a negative direction, the change can be detected. Furthermore, an enormously high required number of values during calculation of the dispersion parameter for achieving the pre-determined threshold value can be a sign for a change in the Coriolis mass flowmeter, which should be more closely examined in order to guarantee a higher accuracy.

It is additionally provided as an advantageous further design that the detection and calculation are carried out until the standard error falls below a threshold value. This falling below the threshold value by the standard error is, thus, the selection criteria for the location parameter, wherein an adequate accuracy is confirmed by this falling below the threshold value, whereby the location parameter is then suitable as a characteristic for the correction of the measurements of a Coriolis mass flowmeter. In general, with an increasing number of values, the quality of the location parameter, here in particular the mean, increases, which means, all in all, that the standard error becomes smaller, whereby a sufficient quality is given, when the standard error falls below the pre-determined threshold value—given by the user.

According to another, particularly advantageous design, it is provided that the constant flow is a zero flow. In the ideal case, the time difference should be equal to zero between both sensors at an oscillation of the measuring tube without flow, namely no time difference or phase shift is present. However, due to the operation and mounting situation, and also deviations already occurring during production, a time difference can be present even at zero flow, which then—provided it has be acknowledged—is used in correcting the measurements of a Coriolis mass flowmeter. In order to exactly determine this offset, the steps of the method are carried out on an oscillating measuring tube without flow, so that the time difference occurring due to the operation and mounting situation can be mathematically removed from the measurements of the Coriolis mass flowmeter during the correction or the determination of the measurements from the detected oscillation.

In order to give the method a limiting term, so that the method, for example, is not infinitely carried out when the threshold value is not achieved, it is provided that a maximum number of iteration steps of the method are pre-determined, and in particular, the number of iteration steps is limited by a maximum number of measurements. In this manner, a practical maximum number of iteration steps can be given before beginning the method, after which the method is terminated, even if the dispersion parameter has not yet reached the threshold value. In this case, the last-determined location parameter is used as the characteristic for correcting the measurement. In particular, the number of determined measurements is suitable as an index for limiting the number of iteration steps of the method, so that, for example, the method is terminated at a practical maximum number of detected values, and in turn, the last-determined location parameter is used as the characteristic.

Here, it does not only occur that the method is carried out infinitely due to not achieving the threshold value, but also that the method, due to achieving the threshold value, is terminated with a very low number of measurements after a short period of time or after very few iteration steps, so that it has been shown to be advantageous when a minimum number of iteration steps of the method is predetermined, in particular, the number of iteration steps is limited by a minimum number of measurements. In this manner, for example, a minimum number of iteration steps can be predetermined, that have to at least be carried out before the method can be terminated, even when the dispersion parameter has already previously reached the threshold value. Here, the number of measurements is also suitable as a reference variable for limiting iteration steps.

In order to obtain at least one additional criteria for the evaluation of the quality of the location parameter, it is provided, according to an advantageous design, that additionally a calculation of the skewness of the measurements occurs, wherein the skewness is a degree for the frequency of positive or negative deviation of the entirety of the values of the location parameter. In general, the skewness describes how strong a tendency of a statistical distribution is and is a degree of the symmetry of probability distribution of a mean. The Gaussian distribution, for example, has a skewness of zero. Conclusions for a diagnosis of the operation state of the Coriolis mass flowmeter can be made from the skewness, since a consistent skewness, for example, indicates a substantial influence of the measurement by the operation state of the Coriolis mass flowmeter, which should be examined more closely in succession to this indication. Knowledge of the skewness can also be used in correcting the determined measurements. Skewness is calculated as follows:

$$g_{1t_0} = \frac{\frac{1}{N}\sum_{i=1}^{N}(\Delta t_{0i} - \bar{t}_0)^3}{\left(\frac{1}{N}\sum_{i=1}^{N}(\Delta t_{0i} - \bar{t}_0)^2\right)^{3/2}}.$$

Equation 3

In addition to skewness, calculation of an additional statistical parameter is also provided, namely the calculation of the kurtosis of the measurements, wherein the kurtosis is a degree for the deviation of the entirety of the values from the normal distribution. Kurtosis describes the slope of the sides of a probability density function. A very high kurtosis value describes a distribution having very steep sides, i.e., a curve having a sharp peak. Kurtosis is calculated as follows:

$$g_{2t_0} = \frac{\frac{1}{N}\sum_{i=1}^{N}(\Delta t_{0i} - \bar{t}_0)^4}{\left(\frac{1}{N}\sum_{i=1}^{N}(\Delta t_{0i} - \bar{t}_0)^2\right)^2} - 3.$$

Equation 4

So that the additionally calculated statistical parameters can be of influence in the scope of correcting the measurements of a Coriolis mass flowmeter, it is provided that skewness and/or kurtosis are additionally used as selection criteria for the characteristic. In addition to, for example, standard error of the mean, the location parameter is thus evaluated additionally by at least a second statistical parameter, so that the correction of the measurements of a Coriolis mass flowmeter can occur with a very high accuracy.

Furthermore, the object is met by a Coriolis mass flowmeter having at least one measuring tube, at least two sensors and at last one actuator, wherein the measuring tube can be excited to at least one oscillation by the actuator in that the Coriolis mass flowmeter is configured and designed so that it is able to carry out a determination of a characteristic according to one of the above-described methods. Here, the Coriolis mass flowmeter has, for example, a control unit programmed in such a manner that it can initiate the implementation of a method and can carry out the determination of the characteristic using the mentioned method steps.

In detail, there are a number of possibilities for designing and further developing the method according to the invention and the Coriolis mass flowmeter according to the invention. Here, please refer to the following detailed description of preferred embodiments in conjunction with the accompanying drawings.

DETAILED DESCRIPTION OF THE INVENTION

Figure 1:
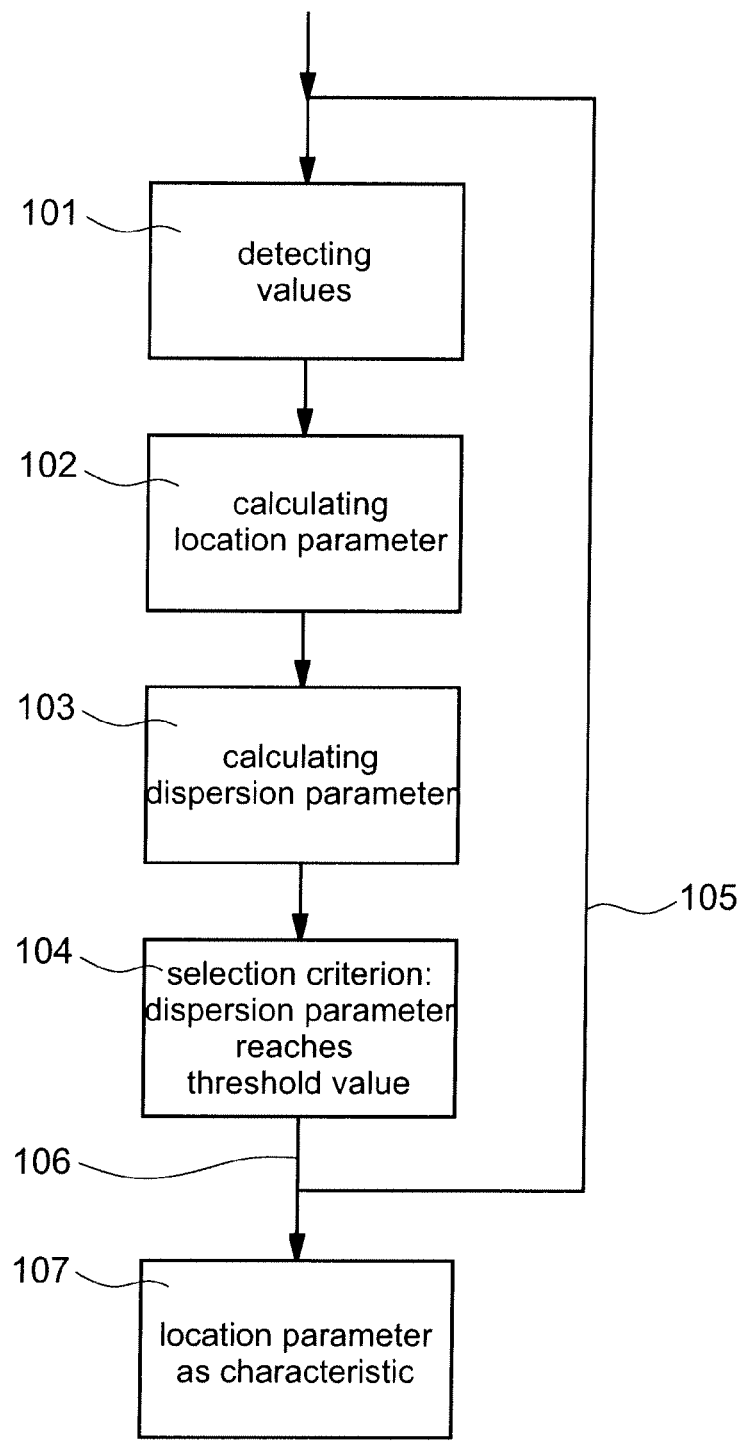
FIG. 1 is a flow chart for a first embodiment of a method in accordance with the invention.

FIG. 1 shows a first flow chart for an embodiment of a first method for determining at least one character for the correction of measurements of a Coriolis mass flowmeter having at least one measuring tube, at least two sensors and at least one actuator, wherein the measuring tube can be excited to at least one oscillation by the actuator. In the first method step, detection of values 101 occurs first, in which the values of a measurand are detected with the sensors at a constant flow in the measuring tube of the Coriolis mass flowmeter. Then—as second method step—a calculation of a location parameter 102 occurs with the determined values. The location parameter describes the location of the entirety of the determined values in respect to a measurement scale and thus indicates a central tendency of the distribution.

Then a calculation of a dispersion parameter 103 occurs using the detected values and the calculated location parameter, wherein the dispersion parameter makes a statement about the distribution of the detected values around the calculated location parameter. The dispersion parameter is, insofar, an index for the quality of the location parameter. Using the selection criteria of whether the calculated dispersion parameter reaches a pre-determined threshold value 104, it is then verified whether the location parameter, which is able to be evaluated by the dispersion parameter, has a sufficient quality. The threshold value is given by the user and thus mirrors the desired accuracy of the measurement correction.

In the case that the calculated dispersion parameter does not reach the threshold value, the course of the method occurs along a first path 105 in FIG. 1, namely with the renewed detection of values 101 with the sensors of the Coriolis mass flowmeter. The detection of additional values and the renewed calculation of the location parameter and the dispersion parameter is carried out so often, until the dispersion parameter has reached a threshold value as the selection criteria or criteria for terminating the method. Here, the detection of values 101 occurs in such a manner that the new and additionally detected values are added to the previously detected values, so that the calculation of the location parameter 102 and the calculation of the dispersion parameter 103 always occurs with the entirety of the values detected by the sensors.

When, as selection criteria, the dispersion parameter reaches the threshold value 104, thus, the quality of the location parameter suffices the requirements of the user, then the method is continued along a second path 106, so that as a conclusion, the location parameter pertaining to the dispersion parameter that fulfills the selection criteria—dispersion parameter reaches threshold value—is used as the characteristic 107. Subsequently, the measurements of the Coriolis mass flowmeter used for detection can be corrected with the location parameter used as characteristic 107. In evaluating the quality of the location parameter using the dispersion parameter, exactly so many values for the determination of the location parameter are used and detected as are required for a sufficiently exact identification of the location parameter, so that the determination of the characteristic always occurs with an optimum number of values. Additionally, temporary and exceptional events that could influence the location of the location parameter during the evaluation of the location parameter are filtered out with the method. The method for determining the characteristic thus adaptively conforms to the respective operation and mounting situations of the Coriolis mass flowmeter.

Figure 2:
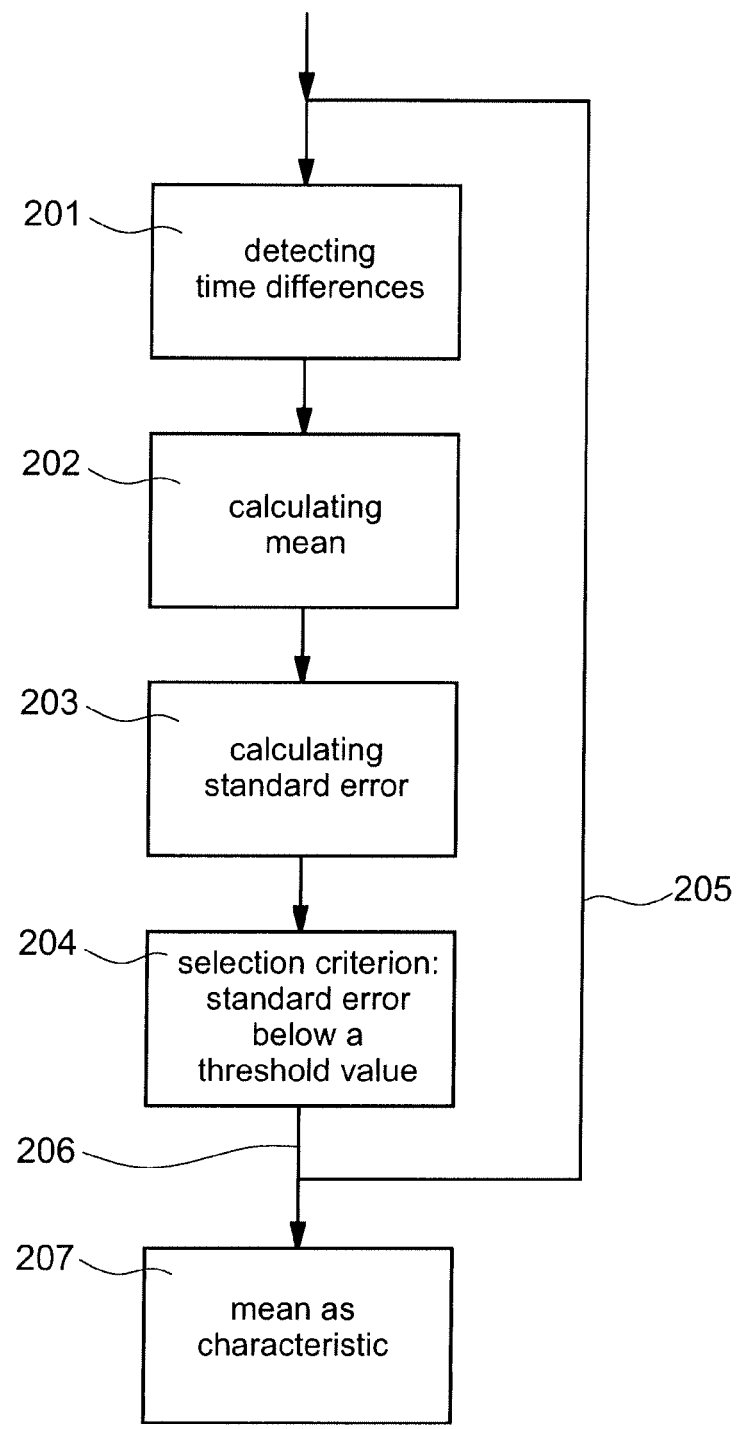
FIG. 2 is a flow chart for a second embodiment of a method in accordance with the invention, FIG. 3 plot of an exemplary course of the standard error, distributed over the sample size for four different operating states and FIG. 4 a flow chart of a further embodiment of a method in accordance with the invention.

FIG. 2 shows a flowchart for a second embodiment of a method for determining at least one characteristic for the correction of measurements of a Coriolis mass flowmeter, having at least one measuring tube, at least two sensors and at least one actuator, wherein the measuring tube can be excited to at least one oscillation by the actuator. The first method step is the detection of time differences 201. These time differences are such time differences that result from a phase shift of the oscillation of different sections of the measuring tube and are detected by both sensors or can be determined from the measurement signals of the sensors. While detecting the time differences by both sensors, there is a constant flow in the measuring tube, in this case zero flow.

Then, a mean 202 of the detected time differences is calculated, wherein this is an arithmetical mean. Subsequently, the standard error 203 of the mean is calculated with the mean and the determined time differences, so that the quality of the mean can be evaluated using the standard error. Using the selection criteria whether the standard error reaches a threshold value 204, a selection is made whether the method continues along a first path 205 or along a second path 206.

When the standard error still lies above the pre-determined threshold value, the method continues along the first path 205, where, namely, additional time differences are detected and the mean or, respectively, the standard error are calculated again. The method is carried out in this loop until the standard error falls below the pre-determined threshold value. As soon as the standard error falls below the threshold value, the method continues along the second path 206, namely the mean pertaining to the respective standard error is subsequently used as the characteristic 207, so that the measurements for the mass flow rate of the Coriolis mass flowmeter used to detect the time differences can be corrected.

There is, inherently, a direct relation between the mass flow rate mY in a Coriolis mass flowmeter and the time difference determined from the phase shift between both sensors using the following equation:

$$m\dot{Y}=K_R(\Delta t_{0i}-\bar{t}_0),\qquad\text{Equation 5}$$

wherein $K_R$ is a calibration factor, $\Delta t_{0i}$ is the current time difference during operation between corresponding sections of the measuring tube—on the inlet and outlet side—at a certain point in time and $\bar{t}_0$ is the characteristic with the mean of the time differences at zero flow determined using the method.

Figure 3:
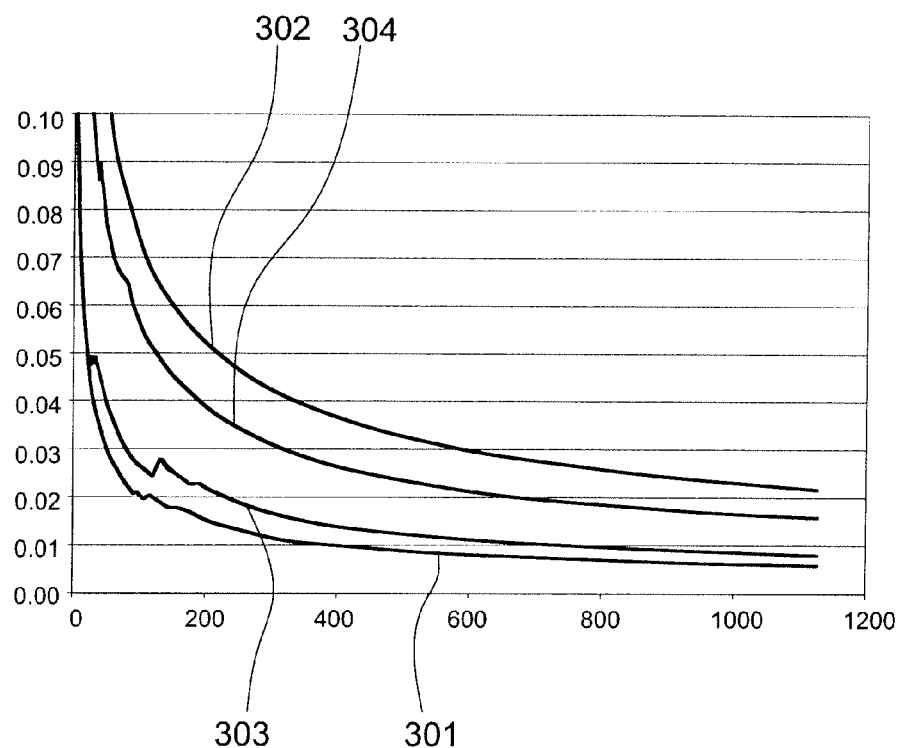

FIG. 3 shows a diagram in which the standard error is plotted along the y-axis and the number of determined values, here the determined time differences, are plotted along the x-axis. The curves 301, 302, 303 and 304 show the course of the standard error dependent on the time differences used for the calculation for four different operation and mounting situations.

It is to be learned from the diagram that in order to reach a standard error that is less than 0.02, substantially fewer time differences have to be determined and used for the calculation in a first mounting situation 301 than, for example, in a mounting situation 302. As an example, about a number of 150 time differences have to be detected for the first mounting situation in order to reach a standard error that is less than 0.02, while more than 1100 time differences have to be detected for mounting situation 302 for this. Thus, an advantage of the method is that the effort for determining the characteristic or mean is oriented to the individual operation and mounting situation, namely, for example, can be terminated much earlier for one mounting situation than or another, since the method for determining the characteristic adapts to the operation or mounting situation through the evaluation of the calculated location parameter via the dispersion parameter.

Figure 4:
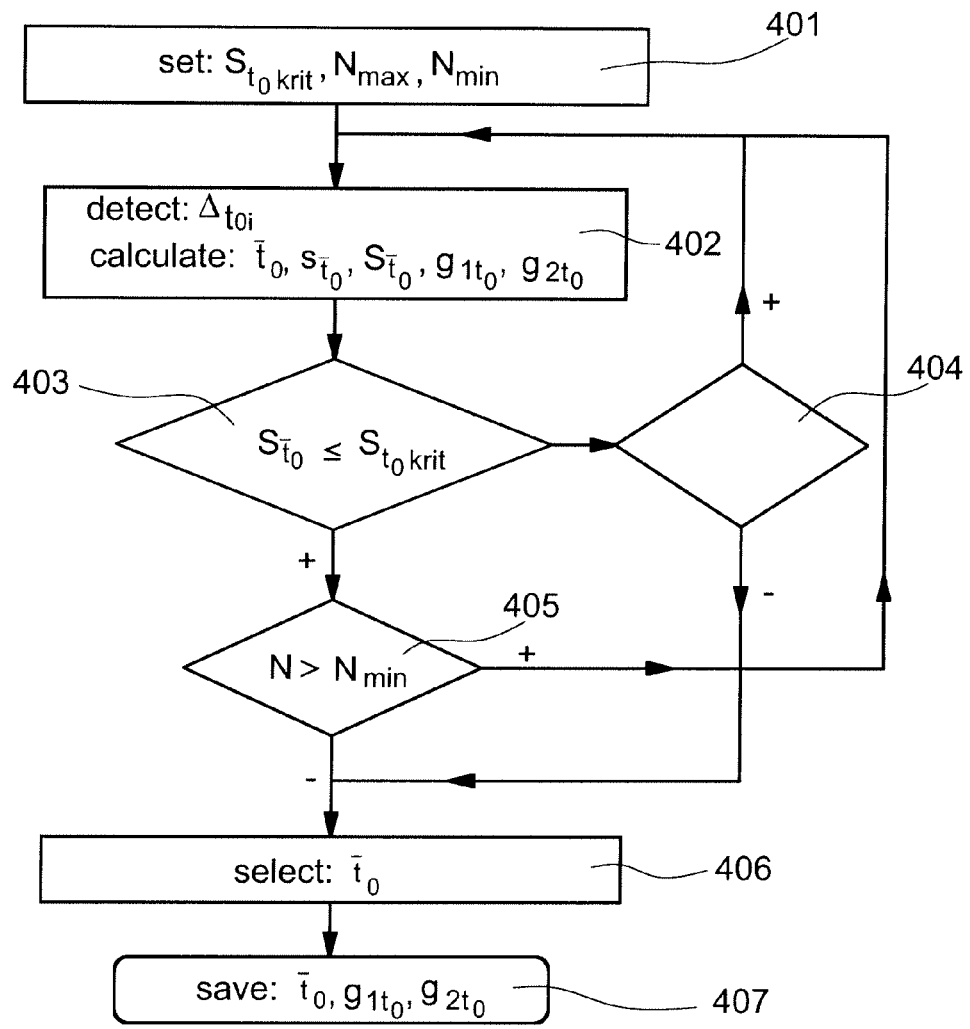

FIG. 4 shows a flowchart for a further embodiment of a method for determining at least one characteristic for the correction of measurements of a Coriolis mass flowmeter. At the beginning of the method, the threshold value $S_{t_0krn}$ the maximum number $N_{max}$ of time differences to be determined and the minimum number $N_{min}$ of time differences 401 are first set. The threshold value $S_{t_0krn}$ acts as a selection criteria. The maximum number $N_{max}$ of time differences and the minimum number $N_{min}$ of time differences give quantitative termination criteria, namely after which maximum number of determined time differences the method is definitely terminated, even if the value has not fallen below the threshold value and up to which minimum number of time differences have to be determined before the method is terminated, even if the value has previously fallen below the threshold value.

After setting the named variables, the detection of the individual time differences $\Delta t_{0i}$, the calculation of the standard deviation $s_{\bar{t}_0}$, the standard error $S_{\bar{t}_0}$, the skewness $g_{1\bar{t}_0}$ and kurtosis $g_{2\bar{t}_0}$ 402 occurs. Then, the calculated standard error is compared 403 to the threshold value as selection criteria.

When the calculated standard error does not lie below the threshold value, it is then verified in the next method step whether the actual number of differences determined in step 404 is smaller than the maximum number of time differences. When the actual number is smaller than the maximum number, the method continues with the renewed detection of time differences and the renewed calculation 402.

In the case that the actual number of time differences directed in step 404 is larger than the maximum number, the method is terminated at this point and the mean of the time differences determined to this point in time is chosen 406 as the characteristic and then stored 407 together with the determined skewness and the determined kurtosis for correcting measurements of the Coriolis mass flowmeter.

In the case that the actual standard error in comparison 403 to the threshold value is less than the threshold value, the next method step verifies whether the actual number of determined time differences is larger than the minimum number of time differences to be determined 405. If the actual number of time differences to be determined is smaller than the minimum number of time differences, the method continues with the renewed detection of additional time differences and the calculation of the mean and the standard error 402.

If the actual number of detected time differences is greater than the minimum number of time differences to be detected, the method continues with the choosing of the calculated mean as characteristic 406 for correcting the measurements of the Coriolis mass flowmeter and then the characteristic, the calculated skewness and the calculated kurtosis are stored and used for the correction of the measurements of the mass flow rate.

What is claimed is:

1. Method for determining at least one characteristic for the correction of measurements of a Coriolis mass flowmeter having at least one measuring tube, at least two sensors and at least one actuator, wherein the measuring tube can be excited to at least one oscillation by the actuator, comprising the following steps:
    detecting values of a measurand during constant flow with the sensors,
    calculating at least one location parameter from the detected values,
    calculating at least one dispersion parameter from the detected values and the location parameter,
    wherein the detection of additional values and the calculation of location parameter and dispersion parameter from the existing and additional values is carried out until the dispersion parameter reaches a threshold value,
    wherein, then, the location parameter corresponding to the dispersion parameter is used as a characteristic for the correction of measurements obtained with the Coriolis mass flowmeter,
    wherein, additionally, a calculation of the kurtosis of the measurements occurs, and
    wherein the kurtosis is a degree for the deviation of the entirety of the values from normal distribution.

* * * * *